No. 873,972.  
PATENTED DEC. 17, 1907.
F. F. WELLS.  
GRAIN SEPARATOR.  
APPLICATION FILED DEC. 29, 1905.
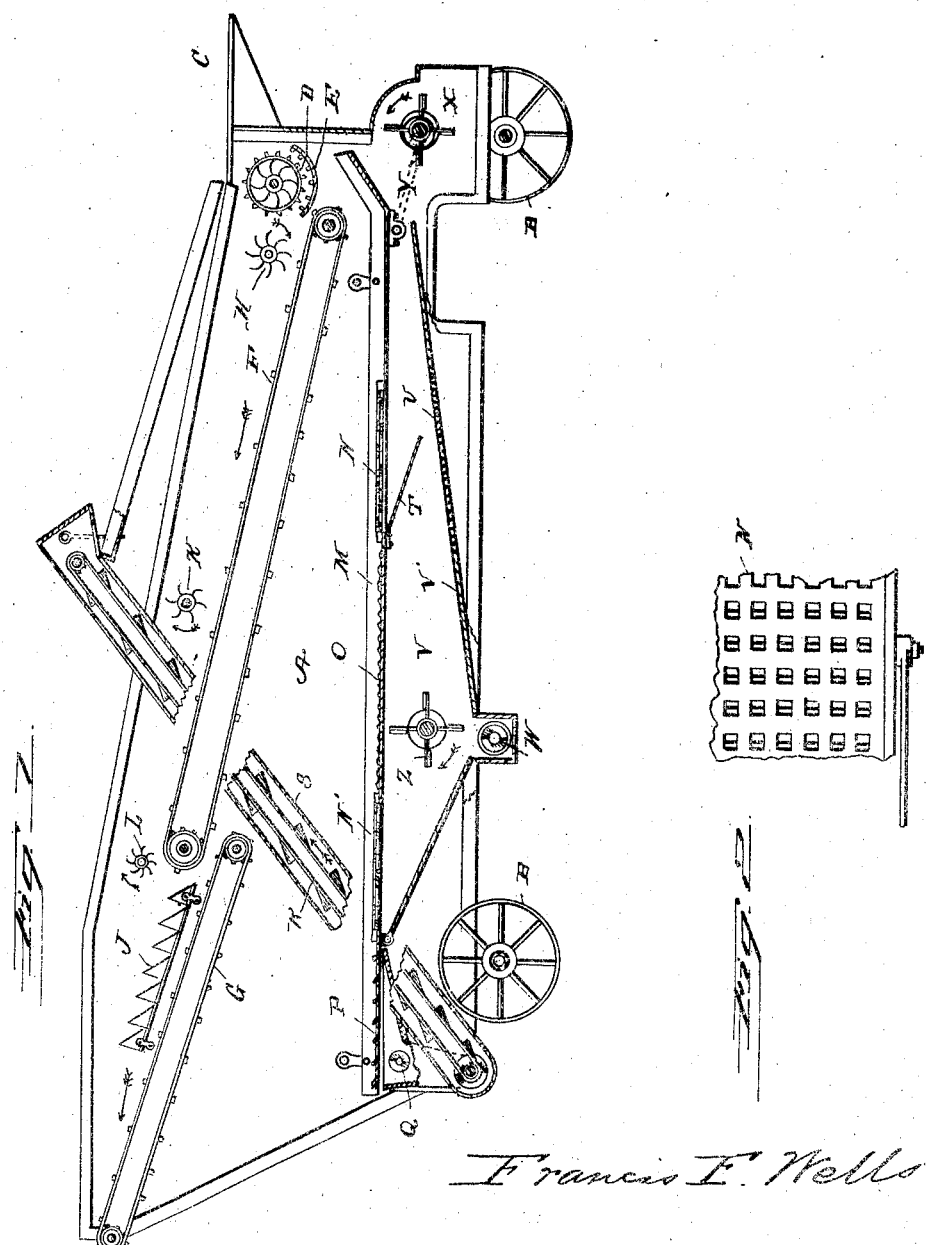
Witnesses  
C. K. Davis  
M. E. Moore
Francis F. Wells  
Inventor  
By  
Attorney

UNITED STATES PATENT OFFICE.

FRANCIS F. WELLS, OF ELKTON, OREGON.

GRAIN-SEPARATOR.

No. 873,972.  Specification of Letters Patent.  Patented Dec. 17, 1907.

Application filed December 29, 1905. Serial No. 293,844.

*To all whom it may concern:*

Be it known that I, FRANCIS F. WELLS, a citizen of the United States, residing at Elkton, in the county of Douglas and State of Oregon, have invented certain new and useful Improvements in Grain-Separators, of which the following is a specification.

My invention relates to improvements in grain separators, and refers to a device of this character acting in conjunction with a threshing machine.

The object of my invention is to provide a grain separator which will have a greater separating capacity than the ones ordinarily in use, and which will also thoroughly clean the grain ready for market.

Other objects of the invention are to provide means which will separate the small seeds from the grain before it leaves the machine, and also to provide independent fans for the riddles so that they may be adjusted to different conditions of grain, either light or heavy.

With these objects in view my invention consists of a grain separator comprising a straw carrier slanting backward from the threshing cylinder, a similar carrier leading from the end of the first carrier, an agitator over said second carrier, said carriers of a mesh to allow the grain to fall through, a continuous shoe beneath the straw carriers and extending the full length of the machine, a plurality of riddles in said shoe, independent fans for each of said riddles, a tailings conveyer at the rear of the machine and an elevator for returning the tailings to the threshing cylinder, means for separating the small seeds from the grain, and a grain conveyer in communication with the riddles.
My invention further consists in certain other novel features of construction and combination and arrangement of parts substantially as disclosed herein.

Figure 1, is a longitudinal sectional view of a complete machine constructed in accordance with and embodying my invention. Fig. 2, is an enlarged plan view of the grain shoe and riddles.

Referring to the drawings: The letter A, designates the frame or casing of the machine which is mounted in the usual manner upon wheels B. At the front end of the machine, a feeding table C, is provided below which is mounted an ordinary threshing cylinder D, beneath which is the concave E, of the usual construction. Below the concave and sloping upward and backward therefrom, is the straw carrier F, and beneath the upper end of this carrier, a similar carrier G, is mounted. The separation of the grain begins as soon as the straw leaves the cylinder, as it first passes under the beater H, located adjacent the cylinder, and is carried by the first straw carrier and deposited on the agitator J, and thence on the second straw carrier which carries the straw upward and out of the machine. Beaters K, and L, are located intermediate the length of the straw carriers and serve to keep the straw constantly in motion. These carriers may be made of wire and slats or similar materials having a mesh so that the grain will fall through.

The operation described, provides a complete separation of the grain from the straw, and the grain falls through the straw carriers onto the shoe or grain bottom M. This shoe extends the full length of the machine and is provided near the front and rear ends with the riddles N, and N'. respectively. The intermediate portion O, between the riddles, is of corrugated sheet metal and serves to convey the surplus from the first riddle N, and all grain separated from the straw in rear of the first riddle, onto the second riddle N', and all coarse and unthreshed grain passes off the second riddle through the tail rake P, into the tailings conveyer Q, and into the return elevator R, and trough S, back to the cylinder to be re-threshed. The grain falling through the first riddle N, falls on a deflecting plate T, which causes the grain to pass over a fine screen U, which serves to remove all the fine seeds and other impurities. Beneath the shoe, a compartment V, is provided having the inclined bottom V', and at the lowest point in the bottom is located the grain-auger or conveyer W, so that all the cleaned grain from both riddles is taken out at the same place. Located in a compartment X, at the front end of the machine, is a fan Y, which is adapted to fan the first riddle, and in the compartment V, another fan Z, is located which is adapted to fan the second riddle. These fans act independently of each other and can be adjusted to different conditions of grain, either light or heavy and as most of the grain (about 90 %) is taken out on the first riddle, there is but little for the second riddle to do, and it is impossible for any grain to blow over.

The direction of rotation of the different members is indicated by arrows, and the various parts are driven by belts (not shown) passing over pulleys on the shafts of the several parts to be driven. The conveyers, elevators and other accessories employed in this machine are common to other machines of this class and need not be further described.

From this description taken in connection with the drawings, it will be obvious that I provide a device which accomplishes all the objects set forth and which is practical and efficient in every particular.

I claim:

The combination with a grain separator, of a continuous shoe extending the full length of the machine having an upwardly inclined forward end and a tail rake formed at the rear end thereof, gratings formed in the shoe near its ends, reciprocating screens over the gratings to form riddles, the central portion of the shoe between the riddles having corrugations formed therein, an angular deflecting plate depending from the shoe beneath one of the riddles, a compartment beneath the shoe having inclined bottom walls and a groove-way formed in the lowest portion of the bottom, a grain auger located therein, independent fans to the riddles, one of the fans being located in the compartment between the two riddles, and the other fan being located in the front end of the machine beneath the upturned end of the shoe, and a fine-mesh seed screen located in the inclined bottom of the compartment so as to receive material from the deflecting plate.

In testimony whereof I affix my signature in presence of two witnesses.

FRANCIS F. WELLS.

Witnesses.
  NELS RYDELL,
  W. H. STARK.